Patented Apr. 6, 1937

2,076,213

UNITED STATES PATENT OFFICE 2,076,213

PRODUCTION OF ALCOHOLS

Gerald Henry van de Griendt, Oakland, Calif., assignor to Shell Development Company, San Francisco, Calif., a corporation of Delaware No Drawing. Application June 17, 1936, Serial No. 85,713

15 Claims. (Cl. 260—156)

This invention relates to the production of alcohols by hydrolysis of alkyl esters of mineral acid acting acids and provides an improved procedure for carrying out such hydrolyses rapidly and economically with minimum loss through undesirable side reactions.

My novel process is applicable to the hydrolysis of any alkyl ester or alkyl ester containing mixture hydrolyzable in the presence of acid. However, for the purpose of making my invention more clear, it will be described with more particular reference to its application to the production of secondary alcohols from absorption products of the corresponding olefines in mineral acid acting acids, as it offers a particularly advantageous method of hydrolyzing the alkyl ester content of such absorption products.

As suitable starting material for the preparation of olefine absorption products which may be treated by the process of my invention, hydrocarbons derived from mineral oils as petroleum, shale oil, and the like, or from mineral oil products, or from natural gas, or from coal, peat and like carboniferous natural materials, may be used, as well as those derived from animal or vegetable oils, fats and/or waxes. The olefines present in such starting material may be of natural occurrence, or the result of vapor or liquid phase cracking or hydrogenation, distillation or other pyrogenetic treatment. The olefines may be used in a pure state, either as individual olefines or pure olefinic mixtures or in admixture with paraffins or other compounds which may be considered inert in the absorption process. Furthermore, such olefines may comprise hydrocarbon fractions consisting of, or predominating in, hydrocarbons containing the same number of carbon atoms to the molecule, or of mixtures of non-isomeric hydrocarbons. Ethylene and/or secondary base olefines (i. e. olefines, both iso and normal which yield secondary alcohols on hydrolysis of their acid absorption products) as propylene, butene 1 and 2, pentene 1 and 2, isopropyl ethylene and higher homologues and analogues thereof may thus be used. Tertiary-base olefines (iso-olefines which yield tertiary alcohols) as isobutylene, trimethylethylene, unsymmetrical methyl ethyl ethylene and the like may be present in the olefinic or hydrocarbon mixtures used as raw material and may be absorbed simultaneously with the secondary olefines or, more preferably, may be selectively absorbed in a secondary olefine absorption product as more fully described and claimed in my co-pending application with William Engs, Serial Number 734,118, filed July 7, 1934, or in any other suitable manner to give an absorption product from which, by the process of the present invention, high yields of both secondary and tertiary alcohols may be obtained. In some cases, however, it may be more desirable to selectively remove the tertiary olefine content of the olefinic starting material more or less completely by selective absorption or polymerization or other suitable method and to apply my improved procedure to the absorption product subsequently obtained containing substantially only absorbed ethylene and/or a secondary olefine or secondary olefines.

Suitable mineral acid acting acids which may be used as olefine absorption media in preparing alkyl esters which may be hydrolyzed by the process of my invention include: inorganic acids, of which dithionic, sulfuric, phosphoric and pyrophosphoric are typical, or organic acids as benzene sulfonic, naphthalene sulfonic, toluene sulfonic, and homologues and analogues thereof, or "acid liquors" such as are obtained by the absorption of olefines in mineral acid acting acids such as the above. The concentrations in which such acids are customarily used for the absorption of olefines vary widely, depending upon the character of the olefine or olefines involved, the olefinic concentration, the temperature and pressure at which the absorption is carried out, and like known factors. The absorption conditions chosen will affect the composition of the resulting absorption product, particularly as regards the proportion of mono to poly alkyl esters present where a polybasic acid is used. But irrespective of its method of preparation, the olefine absorption product will usually comprise an aqueous solution of neutral and/or acid esters with some free mineral acid acting acid and may or may not contain small amounts of polymer. Free alcohol and very low percentages of free hydrocarbons may also be present.

Hitherto it has been necessary, in order to convert the ester content of such absorption products to alcohol, to substantially neutralize the acid content in order to prevent regeneration of olefine during the hydrolysis and distillation treatments given. As this involved a serious loss of acid, it has been more general practice to accept olefine evolution as a necessary evil which at best could only be minimized by slow temperature hydrolysis usually at low acid concentrations or by distillation and/or refluxing treatments in which highly concentrated olefine, which could be more profitably reworked, was generated.

I have found that these undesirable compromise methods of operation are unnecessary and that by carrying out alkyl ester hydrolysis under a pressure greater than the partial pressure of the olefine or olefines involved such that substantial escape of olefine is prevented, not only may the loss of olefine be avoided but also the time required for hydrolysis may be materially shortened with consequent reduction in equipment cost.

The process of my invention may be applied in many different ways. For example, one simple method for the hydrolysis of the alkyl ester content of olefine absorption products may comprise dilution of the absorption product with water and heating the diluted mixture in a closed system, preferably of little or no free space, so as to prevent the escape of olefine gas. Such operations permit the use of higher hydrolysis temperatures and higher free acid concentrations than have heretofore been economically feasible and markedly reduce the time required for hydrolysis. A variation which offers economy in the saving of power, comprises carrying out the above pressure hydrolysis with agitation only until the polyalkyl ester content has been substantially reduced and then holding the mixture under the same or other suitable pressure at which escape of olefine is prevented until hydrolysis of the alkyl acid ester or esters has been effected to the desired extent. In this manner agitation, which may be any suitable method of mechanical stirring or mixing in a centrifugal pump or the like or more preferably, in order to reduce equipment corrosion, may comprise bubbling of olefine gas under pressure through the acid liquor, may be reduced to a minimum with consequent saving in power consumption. An alternative procedure which offers some advantage may comprise carrying out the polyalkyl ester conversion at a higher acid concentration on a hydrocarbon free basis, i. e. with a higher ratio of acid to water (both free and combined acid and water being included), than that at which the alkyl acid ester hydrolysis is carried out. This may be accomplished by adding water to the mixture under treatment between the two hydrolysis steps. For the first of the hydrolysis steps, either acid or water may be added. Still another method of operation which, however, is preferably only used with ethyl and/or propyl esters which are less subject to decomposition to olefine than their higher homologues, comprises carrying out the improved pressure hydrolysis procedure until the dialkyl esters are substantially converted, then subjecting the product to steam distillation, preferably after further dilution, whereby hydrolysis of the alkyl acid ester or esters and separation of the alcohol produced from the free acid are effected substantially simultaneously. It is, of course, obvious that where the alkyl acid esters are to be converted to other products than alcohols, the last hydrolysis operation may be replaced by any other suitable method of treatment, such, for example, as alkali neutralization, where alkyl ester salts are to be prepared.

The free acid concentrations and temperature and pressure conditions which it will be desirable to maintain during the hydrolysis treatment will depend upon the alkyl ester or esters involved, the nature of the free acid present, the nature and amount of tertiary alcohol present, if any, and like factors which make it difficult to fix limits which will fit all cases. However, it is generally preferable to avoid such high acid concentrations and temperatures as promote excessive polymerization of the olefine or olefines present. This limitation should be observed with particular care where absorbed tertiary base olefines are also present. The extreme dilutions practiced in the past are likewise preferably avoided not only because they materially prolong the time required for hydrolysis, particularly of poly alkyl esters, but also because they may promote reversion to olefine even when very high pressures are employed, although to a markedly less degree than where prior art procedures are adapted. Acid concentrations below about 50% are preferably not used. Acid concentrations of about 50% to about 90% or more may be resorted to but the preferred range is from about 70% to about 85%, calculated on a hydrocarbon free basis.

Temperatures above normal are preferred for the hydrolysis operations, as the rate of hydrolysis is increased thereby. Very high temperatures such as temperatures of about 100° C. and above are usually less desirable than lower temperatures because of the polymerization losses they occasion when using acid concentrations in the preferred range. Temperatures of about 40° C. to about 75° C., are practical, although temperatures between about 45° C. and about 60° C., are generally preferred. The time required for hydrolysis will depend upon the particular conditions of acid concentration and temperature chosen. In any case the higher the pressure, at least up to the point of liquefaction of the olefine or olefines present under the operating conditions, the lower the olefine loss during hydrolysis. High pressures of the order of 300 to 400 pounds per square inch may be used, although lower pressures such as 40–100 pounds per square inch have also been successful and because they permit the use of cheaper equipment are generally preferred.

The following examples of specific applications of my invention show the advantages which may be obtained over prior procedures:

*Example I*

An absorption product obtained by agitating 94.6% $H_2SO_4$ with a pentane-amylene fraction of cracked petroleum oil from which tertiary olefines and more reactive unsaturated hydrocarbons had been substantially completely removed, was diluted with 30% by volume of water and hydrolyzed under different conditions. The results obtained are shown in the following table:

| Time of hydrolysis | Temperature of hydrolysis | Pressure lbs./sq. in. | Stirring conditions | Alcohol yield |
|---|---|---|---|---|
| | | | | *Percent* |
| 6 hours | 40° C. | atmospheric | Stirred rapidly in atmosphere of amylene. | 58.5 |
| 6 hours | 40° C. | 10 | Stirred rapidly in closed mixer | 60 |
| 10 minutes | 50° C. | 18 | do | 65.7 |

*Example II*

A mixture of dibutyl sulfate and butyl hydrogen sulfate with free sulfuric acid obtained by absorbing secondary butylene in sulfuric acid was divided into two parts and hydrolyzed, one part under pressure and the other at atmospheric pressure. The other hydrolysis conditions, namely, a temperature of 65° C., sulfuric acid concentration on a hydrocarbon free basis of 75% and a hydrolysis time of 30 minutes were the same in both cases. The results expressed as % of absorbed secondary butylene were as follows:

| | Pressure | |
|---|---|---|
| | Atmospheric | 65 lbs./sq. in. |
| Alcohol yield | Percent 58.7 | Percent 92.5 |
| Butylene lost in hydrolysis | 41.3 | 7.5 |

In another similar case the hydrolysis was carried out in two stages, in the first of which the mixture was stirred for 20 minutes at 55° C., then held at the same pressure (about 85 pounds per sq. in.) without stirring for an additional 100 minutes and a recovery of 88% of the absorbed butylene was obtained as secondary butyl alcohol.

While I have described my invention with more particular reference to hydrolysis in closed systems of little or no free space, it will be understood that this implies no limitation as in some cases it may be more advantageous to carry out the operations using a circulation of the olefine or olefines involved, under pressure. In this manner mechanical agitation may be dispensed with and much of the corrosion difficulties inherent in the use of moving parts in acid solutions may be eliminated. Either batch intermittent or continuous methods of operation may be used. Whatever modification of my procedure is adopted, however, it will be evident that by carrying out the hydrolysis of alkyl esters of mineral acid acting acids in a substantially closed unit under pressure greater than the partial pressure of the corresponding olefine, many advantages in efficiency and economy of operation not attainable by prior methods may be realized.

I claim as my invention:

1. A process for hydrolyzing the absorbed olefine content of an acid liquor in a substantially closed unit which comprises heating the acid liquor with water under acid conditions while avoiding distillation and maintaining a pressure greater than the partial pressure of the absorbed olefine content in the hydrolyzing unit during hydrolysis and a temperature below the critical temperature of the olefine.

2. A process for hydrolyzing an alkyl ester prepared by absorbing an olefine containing at least 3 carbon atoms in a polybasic mineral acid which comprises heating said ester with water under acid conditions in a substantially closed unit while avoiding distillation and maintaining a pressure greater than the partial pressure of the absorbed olefine content in the hydrolyzing unit during hydrolysis.

3. A process for hydrolyzing the absorbed olefine content of an acid liquor formed from $H_2SO_4$ which comprises heating the sulfuric acid liquor in a substantially closed unit with water to not less than 40° C. while avoiding distillation and maintaining a pressure greater than the partial pressure of the absorbed olefine content in the hydrolyzing unit during hydrolysis.

4. A process for hydrolyzing an absorption product of a secondary olefine in a polybasic mineral acid in a substantially closed unit which comprises heating said secondary olefine absorption product with water under acid conditions while avoiding distillation and maintaining a pressure greater than the partial pressure of the absorbed olefine content in the hydrolyzing unit during hydrolysis.

5. A process for hydrolyzing a propyl ester of a polybasic mineral acid which comprises heating said ester with water under acid conditions while avoiding distillation and maintaining a pressure greater than the partial pressure of propylene in the hydrolyzing unit during hydrolysis and passing propylene into contact with the acid liquor during said hydrolysis.

6. A process for hydrolyzing a butyl ester of a polybasic mineral acid which comprises heating said ester with water under acid conditions while avoiding distillation and maintaining a pressure greater than the partial pressure of butylene in the hydrolyzing unit during hydrolysis and passing butylene into contact with the acid liquor during said hydrolysis.

7. A process for hydrolyzing an amyl ester of a polybasic mineral acid which comprises heating said ester with water under acid conditions while avoiding distillation and maintaining a pressure greater than the partial pressure of amylene in the hydrolyzing unit during hydrolysis and passing amylene into contact with the acid liquor during said hydrolysis.

8. In a process of producing a secondary alcohol from the corresponding olefine by absorption of said olefine in a mineral acid acting acid and hydrolysis of the resulting alkyl esters, the step of reducing the neutral ester content of said absorption product by heating said absorption product with water under acid conditions while avoiding distillation and maintaining a pressure greater than the partial pressure of said olefine in the hydrolysis unit during hydrolysis and at least equal to the combined vapor pressure of the constituents of the hydrolytic mixture at the hydrolyzing temperature in a closed system.

9. In a process of producing a secondary alcohol from the corresponding olefine by absorption of said olefine in a mineral acid acting acid and hydrolysis of the resulting alkyl ester, the step of substantially hydrolyzing said ester by heating said absorption product at a pressure at least equal to the vapor pressure of said olefine at the hydrolysis temperature in a substantially closed vessel.

10. A process for hydrolyzing an absorption product of a secondary butylene in sulfuric acid which comprises agitating said absorption product at an acid concentration and temperature and for a time under a pressure greater than the partial pressure of butylene under the existing conditions in a substantially closed vessel at which substantial conversion of the dibutyl sulfate content of said absorption product to secondary butyl alcohol and butyl acid sulfate takes place and then maintaining said converted product under a pressure greater than the partial pressure of butylene until substantial hydrolysis of the remaining butyl acid sulfate is effected.

11. A process for hydrolyzing an absorption product of a secondary butylene in sulfuric acid which comprises adjusting the sulfuric acid concentration of said absorption product to about 50% to about 90% on a hydrocarbon free basis and heating the absorption product at about 40° C. to about 75° C. in a substantially closed vessel for a time under a pressure greater than the partial pressure of said butylene at which hydrolysis of said absorption product takes place.

12. A process for hydrolyzing an absorption product of a secondary butylene in sulfuric acid which comprises heating said absorption product with water under acid conditions while avoiding distillation and maintaining a pressure of at least about 40 pounds per square inch.

13. A process for hydrolyzing a propyl ester of a polybasic mineral acid which comprises heating said ester with water under acid conditions while avoiding distillation and maintaining a pressure greater than the partial pressure of propylene in the hydrolyzing unit during hydrolysis which is also greater than the combined vapor pressures of the constituents of the hydrolytic mixture at the hydrolyzing temperature in a closed system.

14. A process for hydrolyzing a butyl ester of a polybasic mineral acid which comprises heating said ester with water under acid conditions while avoiding distillation and maintaining a pressure greater than the partial pressure of butylene in the hydrolyzing unit during hydrolysis which pressure is greater than the combined vapor pressures of the constituents of the hydrolytic mixture at the hydrolyzing temperature in a closed system.

15. A process for hydrolyzing an amyl ester of a polybasic mineral acid which comprises heating said ester with water under acid conditions while avoiding distillation and maintaining a pressure greater than the partial pressure of amylene in the hydrolyzing unit during hydrolysis, which pressure is greater than the combined vapor pressures of the constituents of the hydrolytic mixture at the hydrolyzing temperature in a closed system.

GERALD HENRY van de GRIENDT.